(12) United States Patent
Van Nieuwenhove

(10) Patent No.: US 11,047,962 B2
(45) Date of Patent: Jun. 29, 2021

(54) METHOD FOR BINNING TIME-OF-FLIGHT DATA

(71) Applicant: SOFTKINETIC SENSORS NV, Brussels (BE)

(72) Inventor: Daniel Van Nieuwenhove, Hofstade (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 573 days.

(21) Appl. No.: 15/321,427

(22) PCT Filed: Jun. 19, 2015

(86) PCT No.: PCT/EP2015/063834
§ 371 (c)(1),
(2) Date: Dec. 22, 2016

(87) PCT Pub. No.: WO2016/005168
PCT Pub. Date: Jan. 14, 2016

(65) Prior Publication Data
US 2017/0212228 A1    Jul. 27, 2017

(30) Foreign Application Priority Data
Jul. 9, 2014    (EP) .................................... 14176356

(51) Int. Cl.
*G01C 3/08*    (2006.01)
*G01S 7/4915*    (2020.01)
(Continued)

(52) U.S. Cl.
CPC ............ *G01S 7/4915* (2013.01); *G01S 7/497* (2013.01); *G01S 17/36* (2013.01); *G01S 17/894* (2020.01); *G01S 17/86* (2020.01)

(58) Field of Classification Search
CPC ........ G01S 7/4915; G01S 7/497; G01S 17/36; G01S 17/89; G01S 17/86; G01S 17/894
(Continued)

(56) References Cited

U.S. PATENT DOCUMENTS 5,710,754 A  *  1/1998  Kaku ........................ H04L 5/02
                                                                     370/207
6,144,711 A  *  11/2000  Raleigh ................ H04B 7/0615
                                                                     375/346
(Continued)

FOREIGN PATENT DOCUMENTS

CN    102393515 A    3/2012
CN    103852754 A    6/2014
(Continued)

OTHER PUBLICATIONS

International Search Report and Written Opinion for International Application No. PCT/EP2015/063834 dated Jul. 9, 2015.
(Continued)

*Primary Examiner* — Samantha K Abraham
(74) *Attorney, Agent, or Firm* — Daniel T. Wehner

(57) ABSTRACT

The invention relates to a method for binning TOF data from a scene, for increasing the accuracy of TOF measurements and reducing the noise therein, the TOF data comprising phase data and confidence data, the method comprising the steps of acquiring a plurality of TOF data by illuminating the scene with a plurality of modulated signals; associating each modulated signal with a vector defined by a phase and a confidence data, respectively; adding the plurality of vectors for obtaining a binned vector; determining the phase and confidence of the binned vector; processing the phase and confidence data of the binned vector for obtaining depth data of the scene.

7 Claims, 3 Drawing Sheets

(51) Int. Cl.
*G01S 17/36* (2006.01)
*G01S 7/497* (2006.01)
*G01S 17/894* (2020.01)
*G01S 17/86* (2020.01)

(58) Field of Classification Search
USPC .............................................. 356/3.01–5.15
See application file for complete search history.

(56) References Cited

U.S. PATENT DOCUMENTS

| | | | |
|---|---|---|---|
| 6,377,819 B1* | 4/2002 | Gesbert | H04B 7/04 370/277 |
| 7,149,147 B1* | 12/2006 | Goldman | G01S 15/89 367/88 |
| 7,263,453 B1* | 8/2007 | Gansler | G01D 5/24457 702/104 |
| 8,078,211 B2* | 12/2011 | Medvedev | H04B 7/0443 370/334 |
| 8,305,575 B1* | 11/2012 | Goldstein | G01J 3/021 356/326 |
| 8,629,976 B2* | 1/2014 | Hui | G01C 3/08 356/4.01 |
| 8,908,992 B1* | 12/2014 | Rodriguez-Valderrama | H04N 19/60 382/276 |
| 2011/0292370 A1* | 12/2011 | Hills | G01S 7/4912 356/5.01 |
| 2012/0092357 A1* | 4/2012 | Wang | G06T 11/001 345/581 |
| 2013/0002968 A1* | 1/2013 | Bridge | H04N 19/97 348/744 |
| 2014/0049767 A1* | 2/2014 | Benedetti | G01S 17/89 356/5.1 |
| 2014/0189320 A1* | 7/2014 | Kuo | G06F 9/3001 712/222 |
| 2014/0313376 A1 | 10/2014 | Van Nieuwenhove et al. | |
| 2015/0003725 A1* | 1/2015 | Wan | G06T 7/194 382/154 |
| 2015/0193938 A1* | 7/2015 | Freedman | G01S 17/36 382/154 |

FOREIGN PATENT DOCUMENTS

| | | |
|---|---|---|
| JP | 2013033650 A * | 2/2013 |
| WO | WO 2013/104717 A1 | 7/2013 |

OTHER PUBLICATIONS

International Preliminary Report on Patentability for International Application No. PCT/EP2015/063834 dated Jan. 19, 2017.
Chinese Office Action for Chinese Application No. 201580033583.0 dated Sep. 4, 2018.

* cited by examiner

METHOD FOR BINNING TIME-OF-FLIGHT DATA

CROSS-REFERENCE TO RELATED APPLICATIONS

This application is a § 371 national stage entry of International Application No. PCT/EP2015/063834, filed Jun. 19, 2015, which claims priority to European Patent Application No. 14176356.5 filed Jul. 9, 2014, the entire contents of which are incorporated herein by reference.

TECHNICAL FIELD OF THE INVENTION

The invention relates to a method for binning Time-Of-Flight data. In particular, the invention relates to a method for performing more accurate Time-Of-Flight measurements while minimizing the noise.

BACKGROUND OF THE INVENTION

Time-Of-Flight technology (TOF) is a promising technology for depth perception. The well-known basic operational principle of a standard TOF camera system 3 is illustrated in FIG. 1. The TOF camera system 3 captures 3D images of a scene 15 by analysing the time of flight of light from a dedicated illumination unit 18 to an object. TOF camera system 3 includes a camera, for instance a 3D sensor 1 and data processing means 4. The scene 15 is actively illuminated with a modulated light 16 at a predetermined wavelength using the dedicated illumination unit 18, for instance with some light pulses of at least one predetermined frequency. The modulated light is reflected back from objects within the scene. A lens 2 collects the reflected light 17 and forms an image of the objects onto the imaging sensor 1 of the camera. Depending on the distance of objects from the camera, a delay is experienced between the emission of the modulated light, e.g. the so called light pulses, and the reception at the camera of those reflected light pulses. Distance between reflecting objects and the camera may be determined as function of the time delay observed and the speed of light constant value.

The distance of objects from camera can be calculated as follows. For clarity purposes, an example of signals is given in FIG. 2. A modulation signal S 16 is sent towards an object. After reflection on the object, a signal $S_\varphi$ 17 is detected by a photodetector. This signal $S_\varphi$ is phase-shifted by a phase $\varphi$ compared to the original signal S, due to the travelling time. For instance, if the signal S 16 is a sinusoidal wave of the form:

$$S = A \cos(2\pi f t) \quad \text{(eq. 1)}$$

then, $S_\varphi$ can be seen as a phase-shifted wave with the following mathematical form:

$$S_\varphi = A \cos(2\pi f t + \varphi) = A \cos(2\pi f t)\cos(\varphi) - A \sin(2\pi f t)\sin(\varphi). \quad \text{(eq. 2)}$$

By defining the so-called in-phase I and quadrature Q components by:

$$I = A \cos(\varphi) \text{ and } Q = A \sin(\varphi) \quad \text{(eq. 3, 4)}$$

then $S_\varphi$ can be written as $$S_\varphi = I \cos(2\pi f t) - Q \sin(2\pi f t). \quad \text{(eq. 5)}$$

This equation enables representing $S_\varphi$ in its polar form, as a vector, represented in FIG. 3, with $\varphi$ being the phase of $S_\varphi$ and r being a parameter corresponding to the amplitude A of the signal $S_\varphi$ and being also related to the so-called confidence.

$\varphi$, I and Q are key parameters for measuring the distance of objects from camera. To measure these parameters, the photodetected signal $S_\varphi$ is usually correlated with electrical reference signals named $S_I$, $S_{\bar{I}}$, $S_Q$ and $S_{\bar{Q}}$. $S_I$, $S_{\bar{I}}$, $S_Q$ and $S_{\bar{Q}}$ are electrical reference signals shifted by 0°, 180°, 90° and 270° respectively, compared to the original optical signal S, as illustrated in FIG. 2. The correlation signals obtained are defined as follows:

$$S_{\varphi,I} = S_\varphi \cdot S_I$$

$$S_{\varphi,\bar{I}} = S_\varphi \cdot S_{\bar{I}}$$

$$S_{\varphi,Q} = S_\varphi \cdot S_Q$$

$$S_{\varphi,\bar{Q}} = S_\varphi \cdot S_{\bar{Q}}. \quad \text{(eq. 6-9)}$$

Then, the two parameters I and Q can be calculated such that:

$$I = A_S \cdot \alpha \cdot (S_{\varphi,I} - S_{\varphi,\bar{I}}) \text{ and }$$

$$Q = A_S \cdot \alpha \cdot (S_{\varphi,Q} - S_{\varphi,\bar{Q}}). \quad \text{(eq. 10-11)}$$

$A_S$ and $\alpha$ are, respectively, the amplitude change of the photodetected signal $S_\varphi$ and the efficiency of the correlation. The extraction of $\varphi$ depends on the shape of the modulation signal S. For example, if S is a sine wave, then $$\varphi = \begin{cases} \arctan\dfrac{Q}{I} & \text{if } I, Q \geq 0 \\ \arctan\dfrac{Q}{I} + \pi & \text{if } I < 0 \\ \arctan\dfrac{Q}{I} + 2\pi & \text{if } Q < 0, I \geq 0 \end{cases} \quad \text{(eq. 12-14)}$$

Once the phase $\varphi$ is known, the distance $D_\varphi$ of objects from camera can be retrieved thanks to the following formula:

$$D_\varphi = \frac{c \cdot (\varphi + 2\pi \cdot n)}{4\pi \cdot f_{mod}} \quad \text{(eq. 15)}$$

where $f_{mod}$ is the modulation frequency and n is an integer number.

In prior art, data binning is a technique used for reducing the noise of images. It's a data pre-processing technique used to reduce the effect of minor observation errors. The original data values which fall in a given small interval, a bin, are replaced by a value representative of that interval, often a central value.

In the context of image processing, binning is the procedure of combining different image data into one single image data. The binning can be temporal or spatial. For temporal binning, one single pixel acquires data at different moments in time and the acquired data are combined to form on single data representative of an interval of time. For spatial binning, the data acquired by a plurality of pixels, at one single moment in time, are combined to form one single data representative of a spatial interval. For instance, an array of 4 pixels becomes a single larger pixel, reducing the overall number of pixels. This aggregation, reducing the number of data, facilitates the analysis. Binning the data may also reduce the impact of read noise on the processed image.

In the context of Time-Of-Flight measurements, binning techniques have been implemented but very often, these methods are not accurate. The phase φ is often obtained by performing a series of measurements and averaging the measured phase, as it will be explained in the following paragraphs.

US patent application no. U.S. 2014/049767 A1 is a prior art reference related to the present invention.

In order to obtain accurate measurement, it is important to ensure a correct measurement of parameters I and Q. A solution remains to be proposed in order to improve the accuracy of these measurements.

SUMMARY OF THE INVENTION

The present invention relates to a method for binning Time-Of-Flight data, the Time-Of-Flight data comprising phase data and confidence data, according to claim 1.

This method enables to reduce considerably the noise of the Time-Of-Flight measurements. The binned phase $\varphi_f$ obtained with the present invention is also more accurate.

Advantageously, the binning is either temporal, when the plurality of TOF data are acquired at different times, or spatial, when the plurality of TOF data are acquired by different photo-sensitive elements, or a combination of both spatial and temporal binning.

Preferably, the method further comprises the steps of predetermining a confidence target parameter and determining the number of TOF data to be acquired, such that the confidence of the binned vector reaches the predetermined confidence target parameter.

More preferably, when the binning is temporal, the method further comprises the steps of predetermining a movement threshold; detecting movement of the scene; and stopping adding TOF data if the detected movement of the scene is above the predetermined movement threshold. This movement threshold ensures that the measurement remains accurate.

More advantageously, when the binning is spatial, the method further comprises the steps of predetermining a depth threshold; detecting the depth of the scene; and stopping adding TOF data if the detected depth of the scene is above the predetermined depth threshold.

Other advantages and novel features of the invention will become more apparent from the following detailed description when taken in conjunction with the accompanying drawings.

BRIEF DESCRIPTION OF THE DRAWINGS

The present invention shall be better understood in light of the following description and the accompanying drawings.

Advantages and novel features of the invention will become more apparent from the following detailed description when taken in conjunction with the accompanying drawing.

DESCRIPTION OF THE INVENTION

Figure 1:
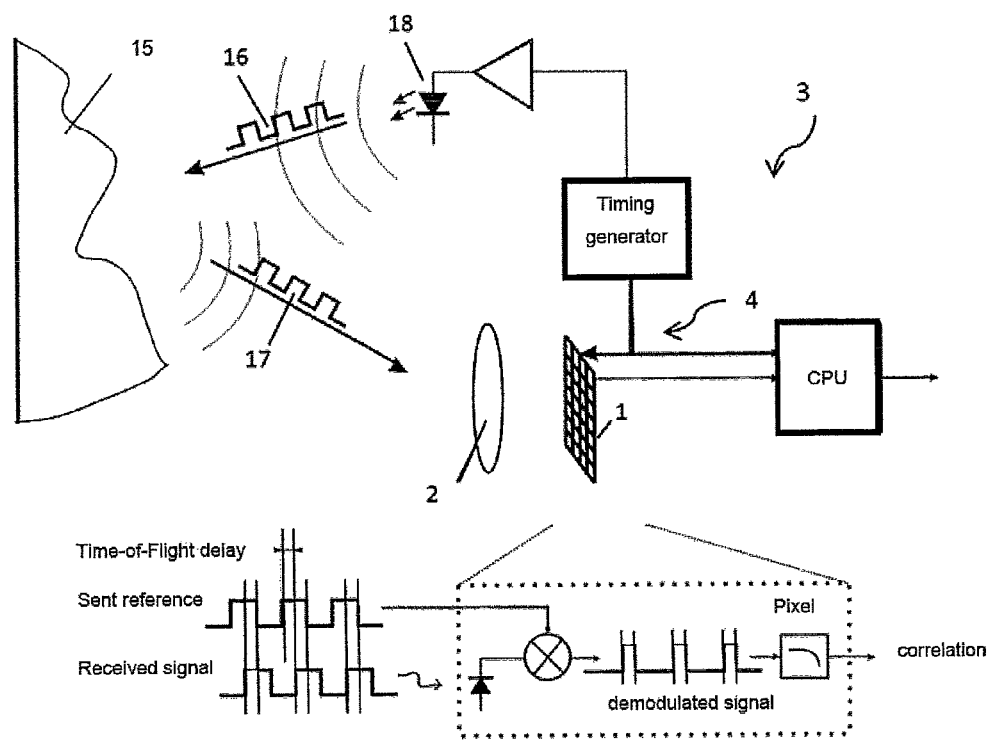
FIG. 1 illustrates the basic operational principle of a TOF camera system.
Figure 2:
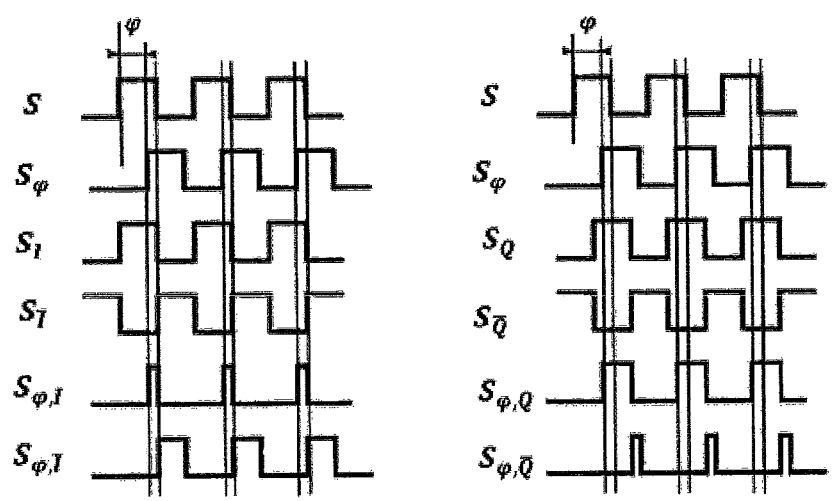
FIG. 2 illustrates an example of signals used to determine correlation measurements in a ToF system.
Figure 3:
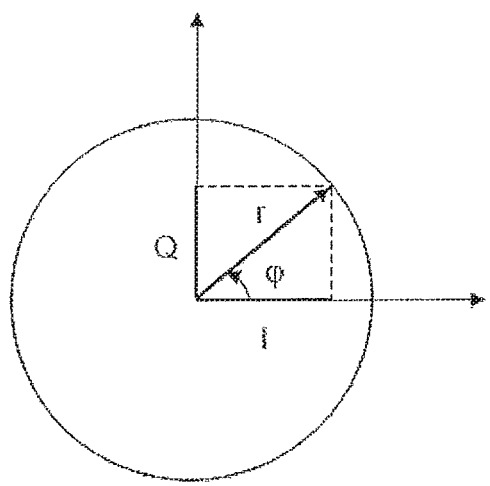
FIG. 3 illustrates the polar form of a reflected signal $S_\varphi$.
Figure 4:
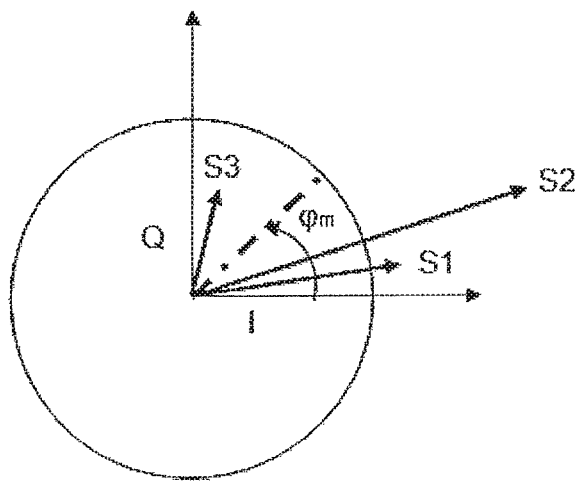
FIG. 4 illustrates a prior art method of phase binning.

In prior art, binning techniques have been implemented to reduce the noise of Time-Of-Flight measurements. One of these techniques is represented in FIG. 4. Each vector $\vec{S_1}, \vec{S_2}$ and $\vec{S_3}$ corresponds to a reflected modulated signal $S_1$, $S_2$ and $S_3$, with a phase $\varphi_1$, $\varphi_2$ and $\varphi_3$ and a norm (or confidence) $r_1$, $r_2$ and $r_3$, respectively. These 3 vectors can be obtained by 3 different pixels at the same time (for spatial binning) or by one single pixel at 3 different times (for temporal binning).

For illustration purposes, only 3 vectors $\vec{S_1}, \vec{S_2}$ and $\vec{S_3}$ have been represented, but the method is commonly used with much more signals and corresponding vectors.

In prior art, the phase binning is performed in a very simply manner. The binned phase $\varphi_m$ is simply the average of $\varphi_1$, $\varphi_2$ and $\varphi_3$ i.e. $\varphi_m = \frac{\varphi_1 + \varphi_2 + \varphi_3}{3}$.

The distance of objects of a scene are then calculated from this averaged phase $\varphi_m$, by using equation 15 for instance.

Another equivalent method is to calculate 3 depth $D_1$, $D_2$ and $D_3$ from $\varphi_1$, $\varphi_2$ and $\varphi_3$ and then to perform the average of $D_1$, $D_2$ and $D_3$ for obtaining the binned depth $D_m$.

Figure 5:
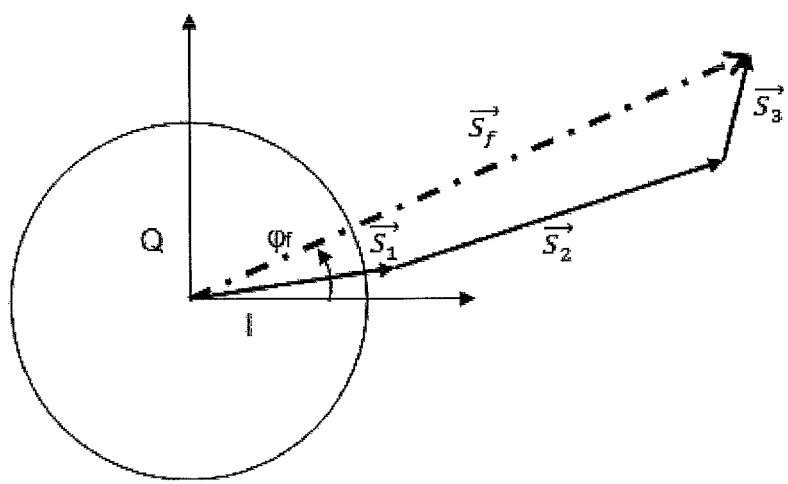
FIG. 5 illustrates a vector addition according to an embodiment of the invention.

In the present invention, a more precise technique to calculate the binned phase is provided. This technique is represented in FIG. 5. Here again, the data of only 3 signals $S_1$, $S_2$ and $S_3$ are combined, or binned, for clarity purposes, but the invention is not limited thereto and can be implemented with any number of signals.

The first step of the method is to acquire a plurality of Time-Of-Flight data by illuminating a scene with a plurality of modulated signals. By Time-Of-Flight data, it is meant the phase and the norm, or confidence, of the signal reflected from a scene. This acquisition can be performed with a lot of different techniques known in prior art, such as correlation for instance.

Then, once the phase and confidence of the modulated signals are known, each Time-Of-Flight data is associated or represented by a vector defined by a phase and a confidence data, respectively. In FIG. 5, 3 vectors $\vec{S_1}, \vec{S_2}$ and $\vec{S_3}$ are represented.

Each vector $\vec{S_1}, \vec{S_2}$ and $\vec{S_3}$ corresponds to a modulated signal $S_1$, $S_2$ and $S_3$, with a phase $\varphi_1$, $\varphi_2$ and $\varphi_3$ and a norm or confidence $r_1$, $r_2$ and $r_3$, respectively. These 3 vectors can be obtained by 3 different pixels at the same time (spatial binning) or by one single pixel at 3 different times (temporal binning).

Then, the method of the present invention consists in performing a vector addition of the 3 vectors for obtaining what we could call "a binned vector" i.e. the vector obtained by adding, or binning, the vectors associated to the modulated signals. Each vector $\vec{S_1}$ can be associated to a complex exponential of the form $r_i e^{i\varphi_i}$.

Once the vector addition has been performed, the binned vector $\vec{S_f}$ can be associated to a complex exponential of the form $r_f e^{i\varphi_f}$ with $r_f e^{i\varphi_f} = r_1 e^{i\varphi_1} + r_2 e^{i\varphi_2} + r_3 e^{i\varphi_3}$ and it is possible to determine the phase $\varphi_f$ and the confidence $r_f$ of this binned vector $\vec{S}_f$.

This phase and confidence of the binned vector $\vec{S}_f$ are finally used to for obtaining depth data of the scene. The phase $\varphi_f$ can be for instance introduced in equation 15 for determining distance parameters.

The binning can be either temporal or spatial, or a combination of both:

For temporal binning, the TOF data to be combined are acquired at different instant in time, i.e. at different frame;

For spatial binning, the TOF data to be combined are acquired at the same instant but by different photo-sensitive elements, e.g. different pixel of a TOF camera;

One of the advantages of the present invention is the following. In practical situation, when measuring a distance of an object from a Time-Of-Flight camera system, it is extremely rare to obtain a configuration where $$\varphi_f = \frac{\varphi_1 + \varphi_2 + \varphi_3}{3}.$$

Hence, the binned phase $\varphi_f$ obtained with the present invention is more accurate and enables to reduce the noise of the measurement.

Figure 6:
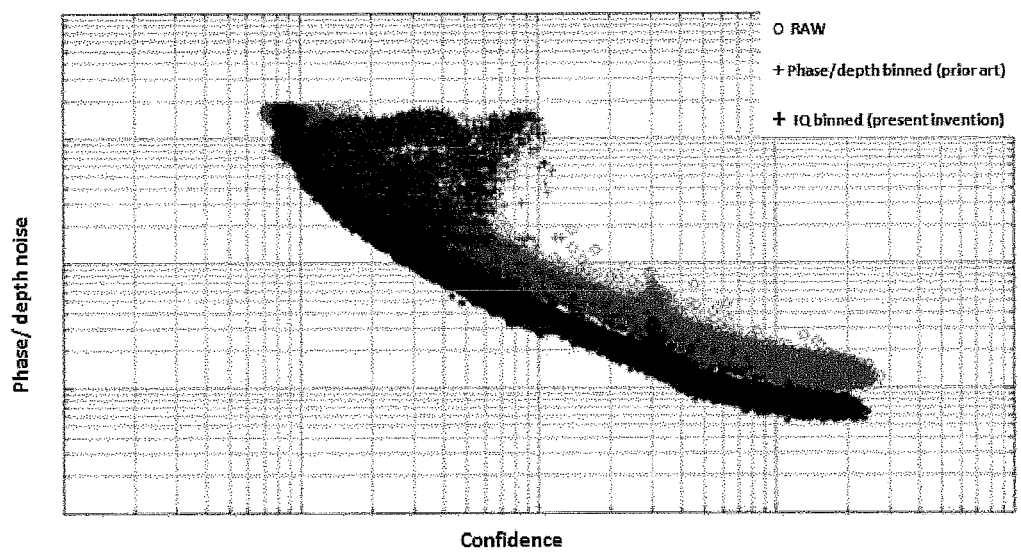
FIG. 6 is a graph comparing the noise obtained with the method of the present invention with the ones obtained with prior art methods.

In FIG. 6, a graph comparing the noise obtained with prior art methods with the one obtained with the present invention is presented.

The graph shows the amount of noise on Y axis as a function of the confidence (or norm) on X axis. The data represented by a circle show the Raw depth values, i.e. without binning. The data represented by a cross correspond to depth values for which a Binning method have been applied in the depth domain, i.e. by a prior art method. Finally, the data represented by a thicker and darker cross correspond to depth values for which the method of IQ binning of the present invention has been applied.

This graph demonstrates that the higher is the confidence, the lower is the noise on Raw data. The present invention enables to reduce the noise on the entire confidence range by a factor 2 while binning in depth domain, i.e. a prior art method, increases the noise at low confidence.

Further steps may be implemented on the method. In one embodiment, the method may further comprise the steps of:

predetermining a confidence target parameter, for instance a threshold value;

determining the number of TOF data to be acquired, such that the confidence of the binned vector reaches the predetermined confidence target parameter.

For temporal binning, the method may further comprise the steps of:

predetermining a movement threshold;

detecting movement of the scene with respect to the movement threshold;

stopping adding Time-Of-Flight data over time if the detected movement of the scene is above the predetermined movement threshold.

The movement detection can be performed by several methods known in prior art. For instance, if the predetermined movement threshold is 25 cm, then if a movement of 50 cm is detected, then the adding and averaging of data is stopped and a new series of acquisition starts. In this way the resulting video stream secures motion robustness while temporally filtering the non-moving parts of the scene. Other ways of detecting movement can rely on changes in confidence and/or other sensors present, for example RGB sensors or accelerometers.

For spatial binning, the method may further comprise the steps of:

predetermining a depth threshold;

detecting the depth of the scene;

stopping adding Time-Of-Flight data if the detected depth of the scene is above the predetermined depth threshold.

This depth threshold criteria can be implemented in various ways. It can be a simple comparison with the threshold, but can also be an iterative process to identify intelligent binning zones (cfr. Superpixels). The end-goal is to preserve edges present in the scene and add the time-of-flight data together to do binning on the parts within one zone at a similar distance.

The invention claimed is:

1. A method for binning Time-Of-Flight (TOF) data from a scene, for increasing the accuracy of TOF measurements and reducing the noise therein, the TOF data comprising phase data and confidence data, the method comprising:

acquiring TOF data by illuminating the scene with a plurality of modulated signals, wherein the TOF data includes a plurality of reflected modulated signals reflected from the scene and corresponding to the plurality of modulated signals;

associating each of the plurality of reflected modulated signals with a vector ($\vec{S}_1$, $\vec{S}_2$ and $\vec{S}_3$), wherein the vector is defined by a phase and a confidence;

adding the plurality of vectors by vector addition for obtaining a binned vector;

determining a phase and a confidence of the binned vector;

determining, based on the phase and the confidence of the binned vector depth data of the scene.

2. The method of claim 1, wherein the TOF data are acquired at different times for performing temporal binning.

3. The method of claim 2, further comprising:

predetermining a movement threshold;

detecting movement of the scene; and stopping adding TOF data if the detected movement of the scene is above the predetermined movement threshold.

4. The method of claim 1, wherein the TOF data are acquired by different photo-sensitive elements for performing spatial binning.

5. The method of claim 1, wherein the obtaining a binned vector is a combination of both temporal and spatial binning.

6. The method of claim 4, further comprising:

predetermining a depth threshold;

detecting a depth of the scene; and stopping adding TOF data if the detected depth of the scene is above the predetermined depth threshold.

7. The method of claim 1, further comprising:

predetermining a confidence target parameter; and determining a number of TOF data to be acquired, such that the confidence of the binned vector reaches the predetermined confidence target parameter.

* * * * *